(12) United States Patent
Ishida et al.

(10) Patent No.: US 12,294,598 B2
(45) Date of Patent: May 6, 2025

(54) ATTACK MONITORING CENTER APPARATUS AND ATTACK MONITORING TERMINAL APPARATUS

(71) Applicant: DENSO CORPORATION, Kariya (JP)

(72) Inventors: Naoya Ishida, Kariya (JP); Takahiro Shidai, Kariya (JP); Taiji Abe, Kariya (JP)

(73) Assignee: DENSO CORPORATION, Kariya (JP)

( * ) Notice: Subject to any disclaimer, the term of this patent is extended or adjusted under 35 U.S.C. 154(b) by 261 days.

(21) Appl. No.: 17/724,970

(22) Filed: Apr. 20, 2022

(65) Prior Publication Data

US 2022/0247772 A1    Aug. 4, 2022

Related U.S. Application Data

(63) Continuation of application No. PCT/JP2020/036208, filed on Sep. 25, 2020.

(30) Foreign Application Priority Data

Dec. 25, 2019   (JP) ................................ 2019-234450

(51) Int. Cl.
    *H04L 9/40*     (2022.01)
    *G06F 21/55*    (2013.01)
(52) U.S. Cl.
    CPC ............................. *H04L 63/1425* (2013.01)
(58) Field of Classification Search
    CPC ............. H04L 63/1425; H04L 63/1416; H04L 63/1441; H04L 63/1433; G06F 21/554; G06F 21/552
    See application file for complete search history.

(56) References Cited

U.S. PATENT DOCUMENTS 8,225,405 B1 *   7/2012  Peterson .............. H04L 63/145
                                                    713/188
10,298,598 B1 *  5/2019  Mcclintock ......... H04L 63/1483
                        (Continued)

FOREIGN PATENT DOCUMENTS

JP         2016143320 A      8/2016

OTHER PUBLICATIONS

Kumar et al., "Black-box Adversarial Attacks in Autonomous Vehicle Technology," 2020 IEEE Applied Imagery Pattern Recognition Workshop (AIPR) Year: 2020 | Conference Paper | Publisher: IEEE.*

(Continued)

*Primary Examiner* — Roderick Tolentino
(74) *Attorney, Agent, or Firm* — Harness, Dickey & Pierce, P.L.C.

(57) ABSTRACT

In an attack monitoring center apparatus, an event log transmitted from an attack monitoring terminal apparatus is received via a communication network. A first pattern and a second pattern are read from an event log occurrence pattern database which describes event log occurrence patterns. The first pattern is referred to in response to an abnormality being detected in the attack monitoring center apparatus; the second pattern is referred to in response to an abnormality being detected in the attack monitoring terminal apparatus. An abnormality is detected based on the event log and the first pattern. The second pattern is transmitted to the attack monitoring terminal apparatus in response to detecting the abnormality based on the event log and the first pattern.

14 Claims, 6 Drawing Sheets

(56) References Cited

U.S. PATENT DOCUMENTS

| | | | |
|---|---|---|---|
| 2012/0137367 A1* | 5/2012 | Dupont | G06F 21/00 726/25 |
| 2014/0046863 A1* | 2/2014 | Gifford | G06Q 50/265 705/325 |
| 2015/0372980 A1* | 12/2015 | Eyada | G06F 21/55 726/1 |
| 2016/0240179 A1* | 8/2016 | Uemura | G11B 27/105 |
| 2019/0095313 A1* | 3/2019 | Xu | G06F 18/24323 |
| 2019/0236162 A1* | 8/2019 | Gross | G06F 16/2477 |
| 2020/0137084 A1* | 4/2020 | Roy | H04L 63/0236 |
| 2020/0336495 A1* | 10/2020 | Tada | H04L 43/16 |

OTHER PUBLICATIONS

Paul et al., "Detecting Low-Rate Replay-Based Injection Attacks on In-Vehicle Networks," IEEE Access Year: 2020 | vol. 8 | Journal Article | Publisher: IEEE.*

* cited by examiner

FIG. 3

| | | INDIVIDUAL PATTERN 1 | | INDIVIDUAL PATTERN 2 | | | INDIVIDUAL PATTERN 3 | | | ... | PATTERN REFERRED TO |
|---|---|---|---|---|---|---|---|---|---|---|---|
| | ECU NAME | FUNCTION NAME | EVENT NAME | ECU NAME | FUNCTION NAME | EVENT NAME | ECU NAME | FUNCTION NAME | EVENT NAME | | |
| ATTACK PATTERN 1 | COMM ECU | FIREWALL | COMM REFUSAL | GW ECU | TOOL AUTHEN | AUTHEN ERROR | GW ECU | NIDS | CYCLE ABNORMAL | ... | 3 |
| ATTACK PATTERN 2 | COMM ECU | FIREWALL | COMM REFUSAL | GW ECU | TOOL AUTHEN | AUTHEN ERROR | INTERN ECU | MESSAGE AUTHEN | MAC AUTHEN ERROR | ... | 3 |
| ATTACK PATTERN 3 | COMM ECU | FIREWALL | COMM REFUSAL | GW ECU | ID FILTERING | FILTER ERROR | INTERN ECU | MESSAGE AUTHEN | MAC AUTHEN ERROR | ... | 3 |
| ATTACK PATTERN 4 | COMM ECU | NIDS | PATTERN ABNORMAL | GW ECU | TOOL AUTHEN | AUTHEN ERROR | GW ECU | NIDS | NUMERAL ERROR | ... | 3 |
| ATTACK PATTERN 5 | GW ECU | TOOL AUTHEN | AUTHEN ERROR | GW ECU | NIDS | CYCLE ABNORMAL | INTERN ECU | MESSAGE AUTHEN | MAC AUTHEN ERROR | ... | 2 |
| ... | ... | ... | ... | ... | ... | ... | ... | ... | ... | ... | ... |
| ATTACK PATTERN n | ... | ... | ... | ... | ... | ... | ... | ... | ... | ... | ... |

FIG. 6

| INDIVIDUAL PATTERN 3 | | |
|---|---|---|
| ECU NAME | FUNCTION NAME | EVENT NAME |
| GW ECU | NIDS | CYCLE ABNORMAL |

…

ATTACK MONITORING CENTER APPARATUS AND ATTACK MONITORING TERMINAL APPARATUS

CROSS REFERENCE TO RELATED APPLICATIONS

The present application is a continuation application of International Patent Application No. PCT/JP2020/036208 filed on Sep. 25, 2020, which designated the U.S. and claims the benefit of priority from Japanese Patent Application No. 2019-234450 filed on Dec. 25, 2019. The entire disclosures of all of the above applications are incorporated herein by reference.

TECHNICAL FIELD

The present application relates to an attack monitoring system that is a system for monitoring cyber attacks and mainly includes an attack monitoring terminal apparatus mounted on a mobile body and an attack monitoring center apparatus provided outside the mobile body.

BACKGROUND

In recent years, technologies for driving support and automated driving control, including V2X (Vehicle to Everything) such as vehicle-to-vehicle communication and vehicle-to-road communication, have been attracting attention. As a result, a vehicle has a communication function, and so-called connectivity of the vehicle has been promoted. As a result, vehicles may be increasingly vulnerable to cyber attacks. Since vehicles move at high speeds, there is a high risk of accidents that could affect people if the vehicles lose the control of the vehicle themselves due to a cyber attack. Stronger defense measures are thereby required against cyber attacks.

Here, in the field of computer systems, countermeasures against cyber attacks have been taken for some time past.

For instance, there is described a log monitoring technique as follows. Such a technique focuses on the fact that there is a combination of log contents that can logically derive the possibility of abnormality when collating the log contents acquired from multiple connected devices. This combination is stored in a storage device as an abnormal pattern in advance, and is collated with the actual log. It is thereby possible to detect the monitoring target suspected of fraud at an early stage.

SUMMARY

According to an example of the present disclosure, an attack monitoring center apparatus is provided as follows. An event log transmitted from an attack monitoring terminal apparatus is received via a communication network. A first pattern and a second pattern are read from an event log occurrence pattern database which describes event log occurrence patterns. The first pattern is referred to in response to an abnormality being detected in the attack monitoring center apparatus; the second pattern is referred to in response to an abnormality being detected in the attack monitoring terminal apparatus. An abnormality is detected based on the event log and the first pattern. The second pattern is transmitted to the attack monitoring terminal apparatus in response to detecting the abnormality based on the event log and the first pattern.

BRIEF DESCRIPTION OF DRAWINGS

The objects, features, and advantages of the present disclosure will become more apparent from the following detailed description made with reference to the accompanying drawings. In the drawings:

FIG. 3 is an explanatory diagram illustrating an event log occurrence pattern DB stored in the attack monitoring center apparatus according to the embodiment of the present disclosure;

FIG. 6 is an explanatory diagram illustrating a second pattern stored in a storage device of the attack monitoring terminal apparatus according to the embodiment of the present disclosure.

DETAILED DESCRIPTION

Hereinafter, an embodiment of the present disclosure will be described with reference to the drawings.

In the present disclosure, the configuration disclosed in each embodiment is not limited to each embodiment alone, but may be combined across the embodiments.

For example, a configuration disclosed in one embodiment may be combined with other embodiments. Further, the disclosed configurations may be collected and combined in each of multiple embodiments.

1. Embodiment (1) Configuration of Attack Monitoring Terminal Apparatus

Figure 1:
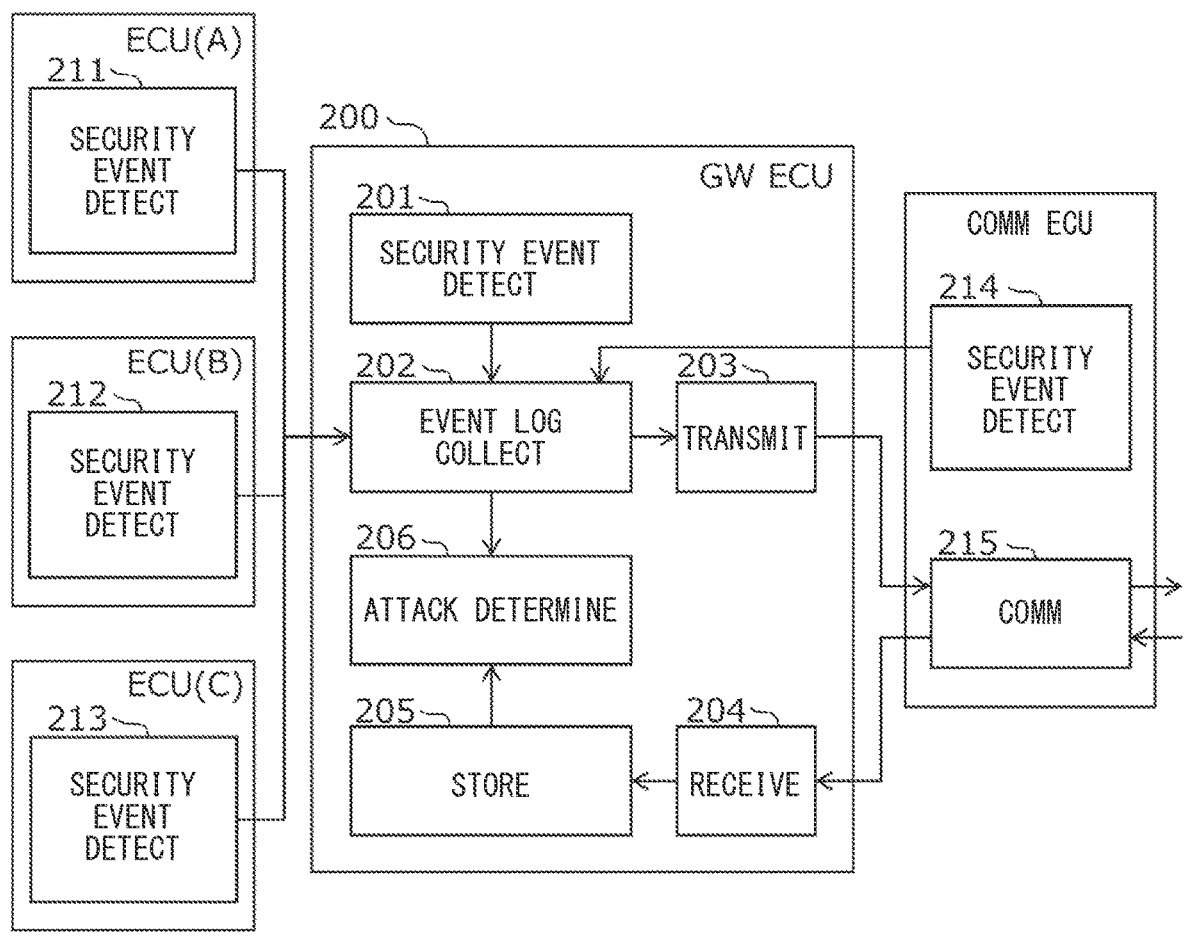
FIG. 1 is a block diagram showing a configuration example of an attack monitoring terminal apparatus according to an embodiment of the present disclosure.

A configuration of an attack monitoring terminal apparatus 200 of the present embodiment will be described with reference to FIG. 1.

This embodiment will describe an example in which a plurality of electronic control units (ECUs) are mounted on a vehicle. FIG. 1 illustrates an electronic control system includes an internal ECU (A), an internal ECU (B), an internal ECU (C), a GW (Gateway) ECU, and a communication ECU, which are mounted on the vehicle. Then, the internal ECU (A), the internal ECU (B), the internal ECU (C), and the communication ECU are connected to the GW ECU.

These ECUs are connected to each other by an in-vehicle network. The in-vehicle network may include not only a communication system such as a Controller Area Network (CAN) and a Local Interconnect Network (LIN), but also any communication system such as Ethernet (registered trademark), Wi-Fi (registered trademark) and Bluetooth (registered trademark).

The internal ECU (A), internal ECU (B), and internal ECU (C) may each be an optional ECU. Such an ECU may be, for example, a drive system electronic control unit that controls an engine, a steering wheel, a brake, etc. The ECU may be, for example, a vehicle-body electronic control unit that controls a meter, and a power window, etc. The ECU may be, for example, an information-system electronic control unit such as a navigation apparatus. The ECU may be, for example, a safety-control electronic control unit that controls to prevent a collision with an obstacle or a pedestrian. The ECUs may be classified into a master and a slave instead of being in parallel.

The attack monitoring terminal apparatus 200 corresponds to the GW ECU in the present embodiment, and the GW ECU includes a function of the attack monitoring terminal apparatus 200. In contrast, the function of the attack monitoring terminal apparatus 200 may be included in another in-vehicle ECU. For example, it may be included in a dedicated attack monitoring ECU or a communication ECU.

The attack monitoring terminal apparatus 200 includes a security event detector unit 201, an event log collection unit 202, a transmitter unit 203, a receiver unit 204, a storage device 205, and an attack determination unit 206. Further, the internal ECU (A), the internal ECU (B), the internal ECU (C), and the communication ECU also include security event detector units 211, 212, 213, and 214, respectively. Hereinafter, when these security event detector units are collectively referred to, they are referred to as each security event detector unit.

Here, the attack monitoring terminal apparatus 200 is sufficient as long as it is an apparatus that monitors attacks from the outside such as cyber attacks. For example, in general, the attack monitoring terminal apparatus 200, which corresponds to what is called an electronic control apparatus, a monitoring apparatus, a gateway apparatus. The attach monitoring terminal apparatus 200 includes an electronic control unit (ECU), a semiconductor circuit element, a personal computer (PC), a smartphone, and a mobile phone.

The attack monitoring terminal apparatus 200 may include a general-purpose CPU (Central Processing Unit), volatile memory such as RAM, non-volatile memory such as ROM, flash memory, or hard disk, various interfaces, and an internal bus connecting them. Then, by executing the software on these hardware, it can be configured to exert the function of each functional block shown in FIG. 1. The same applies to the attack monitoring center apparatus 100 shown in FIG. 2 described later. Of course, the attack monitoring terminal apparatus 200 may be realized by dedicated hardware such as LSI.

The attack monitoring terminal apparatus 200 and other ECUs are mounted on a vehicle that is a "mobile body" in this embodiment. In contrast, the attack monitoring terminal apparatus 200 may be mounted on a fixed object instead of a mobile body.

Here, the "mobile body" means a movable object, and the moving speed is optional. Of course, it also includes the case where the mobile body is stopped. Examples of the mobile body include, but are not limited to, an automobile, a motorcycle, a bicycle, a pedestrian, a ship, an aircraft, and an object mounted thereon. The term "mounted" includes the case where it is directly fixed to the mobile body and the case where it is not fixed to the mobile body but moves together with the mobile body. For example, it may be held by a person riding on a mobile body, or it may be carried on a cargo mounted on the mobile body.

Each security event detector unit of each ECU detects a security event according to the function of each ECU. For example, the security event detector unit 201 detects an authentication error when an external connection tool is connected to the GW ECU. The security event detector units 211, 212, and 213 detect message authentication errors in the messages acquired by the respective internal ECUs. The security event detector unit 214 detects a firewall error for the communication ECU. Note that these are examples of the security event detection function of each security event detector unit, and are not limited to these. Further, each ECU may be provided with more than one security event detection functions.

Then, each security event detector unit generates and stores an event log as a detection result. For example, the event log includes an event occurrence time, an ECU name where an event occurred, a function name, and an event name, but it is not necessary to acquire and store all of them. Information other than these may also be acquired and stored.

The event log collection unit 202 collects an event log generated by each security event detector unit from each connected ECU. The collected event log may be stored in a storage device (not shown). The event log collection unit 202 outputs the collected event log to the transmitter unit 203. Further, the event log collection unit 202 outputs the collected event log to the attack determination unit 206 described later.

The transmitter unit 203, which may also be referred to as a transmitter 203, transmits the event log output from the event log collection unit 202 to the attack monitoring center apparatus 100 via a communication unit 215, which may also be referred to as a transceiver unit 215 or a transceiver 215, of the communication ECU and the communication network. Here, the communication network may be a wired communication network as well as a wireless communication network. Moreover, the communication network may be a combination of a wired communication network and a wireless communication network. The attack monitoring center apparatus 100 is sufficient as long as it is an apparatus that monitors attacks from the outside such as cyber attacks. For example, the attack monitoring center apparatus 100 corresponds to a server apparatus, a monitoring apparatus, or a support apparatus. Specific examples thereof include not only a server apparatus, a workstation, and a personal computer (PC), but also an electronic control unit (ECU), a semiconductor circuit element, a smartphone, and a mobile phone.

The communication network 2 may include a wireless communication system, such as IEEE 802.11 (WiFi (registered trademark)), IEEE 802.16 (WiMAX (registered trademark)), (Wideband Code Division Multiple Access (W-CDMA), High Speed Packet Access (HSPA), Long Term Evolution (LTE), Long Term Evolution Advanced (LTE-A), 4G, 5G. Alternatively, DSRC (Dedicated Short Range Communication) may be also included. The communication network 2 may further include a wired communication system, such as a local area network (LAN), the Internet, or a fixed telephone line.

The receiver unit 204, which may also be referred to as a receiver 204, receives only a second pattern of the event log occurrence patterns from the attack monitoring center apparatus 100 via the communication network and the communication unit 215 of the communication ECU. The details of the event log occurrence patterns will be described later with reference to FIG. 3.

Here, "receiving a second pattern . . . " includes not only the case of receiving a second pattern itself but also the case of receiving information that can generate or restore a second pattern.

The storage device 205, which may also be referred to as a storage 205, stores the second pattern received by the receiver unit 204.

The attack determination unit 206 reads the second pattern from the storage device 205, and detects an abnormality based on the second pattern and the event log output from the event log collection unit 202. Specifically, the event log output from the event log collection unit 202 and the second pattern are compared to see if they match. If they match, it is determined to be abnormal, and it is determined that a cyber attack has been received. The details of the attack determination operation of the attack determination unit 206 will be described later with reference to FIG. 6 and the like.

(2) Configuration of Attack Monitoring Center Apparatus

Figure 2:
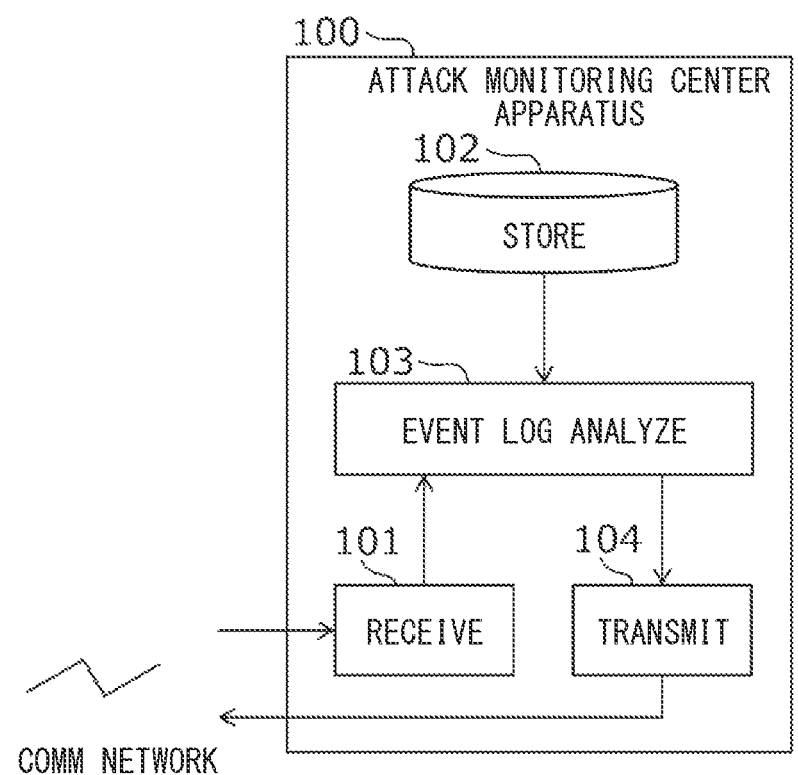
FIG. 2 is a block diagram showing a configuration example of an attack monitoring center apparatus according to the embodiment of the present disclosure.

The configuration of the attack monitoring center apparatus 100 of the present embodiment will be described with reference to FIG. 2.

The attack monitoring center apparatus 100 includes a receiver unit 101, a storage device 102, an event log analyzer unit 103, and a transmitter unit 104.

The receiver unit 101, which may also be referred to as a receiver 101, receives the event log transmitted from the attack monitoring terminal apparatus 200 via the communication network.

The storage device 102, which may also be referred to as a storage 102, stores an event log occurrence pattern database (DB) that describes an event log occurrence pattern expected when a cyber attack is received.

FIG. 3 shows specific examples of the event log occurrence patterns. In FIG. 3, attack patterns 1 to n are chronological (i.e., time series) arrangements of individual patterns corresponding to each event log in a series of event logs expected to occur in a cyber attack. For example, in the attack pattern 1, (i) a communication refusal event based on the firewall function occurs in the communication ECU, (ii) then an authentication error event based on the tool authentication function occurs in the GW ECU, and (iii) finally a cycle abnormality event based on the NIDS function occurs in the GW ECU. The firewall function is a function for detecting access to unauthorized transmission/reception IP addresses and ports when the vehicle receives TCP/IP communication from the outside. NIDS (Network-based Intrusion Detection System) is a network-based intrusion detection system, and is a function of monitoring a pattern, period, or value of a signal flowing on a network. The tool authentication function is a function to authenticate whether the tool is a legitimate tool. In addition, the message authentication function is a function for verifying whether or not an authenticator attached to the received message is correct. Hereinafter, the attack pattern 1 will be focused on and described. Other attack patterns will be described later.

Further, for each attack pattern, the information distinguishing a first individual pattern and a second individual pattern from each other is described. That is, the first pattern corresponds to an individual pattern that is referred to when an abnormality is detected by the attack monitoring center apparatus 100. The second pattern corresponds to an Individual pattern that is referred to when an abnormality is detected by the attack monitoring terminal apparatus 200. The example of FIG. 3 describes the information of an individual pattern to be referred to in the attack monitoring terminal apparatus 200. For example, in the attack pattern 1, the individual pattern 3 is a second pattern. On the other hand, the individual patterns 1 and 2 each are a first pattern.

Instead thereof, a flag for distinguishing between the first pattern and the second pattern may be provided for each individual pattern. For example, if the flag is 0, the first pattern may be indicated; if the flag is 1, the second pattern may be indicated.

The event log occurrence patterns stored in the storage device 102 may be defined as describing (i) the attack monitoring center apparatus 100 being designated to detect an abnormality in the event log, or (ii) the attack monitoring terminal apparatus 200 being designated to detect an abnormality in the event log. For example, the first pattern may be assigned an event indicating the precursory behavior of a cyber attack, and the second pattern may be assigned an event indicating the main attack behavior of a cyber attack. It is thereby possible to configure the vehicle side to detect an abnormality only in the most dangerous behavior of cyber attacks. With such an assignment, even when the resources of the attack monitoring terminal apparatus 200 are weak and the communication network is unstable, the attack monitoring terminal apparatus 200 can determine a cyber attack. As a result, countermeasures against cyber attacks can be executed without delay.

Further, for example, an event that requires a large amount of resources to detect an abnormality may be assigned to the first pattern; an event that requires less resources to detect an abnormality may be assigned to the second pattern. That is, the resources required to detect an abnormality using the first pattern are greater than the resources required to detect an abnormality using the second pattern. Here, as an example of the resource, the processing amount of the CPU and the memory size can be mentioned. With such an assignment, for events that require a lot of resources to detect an abnormality, the event log can be analyzed and the abnormality can be detected by the resource-rich attack monitoring center apparatus 100. The burden on the attack monitoring terminal apparatus 200 can thus be reduced.

The event log analyzer unit 103 detects an abnormality based on the event log received by the receiver unit 101 and the first pattern of the event log occurrence pattern read from the storage device 102. Specifically, whether or not the event log received by the receiver unit 101 and the first pattern read from the storage device 102 match is determined. When they match, it is determined to be abnormal. For example, suppose a case where the event log received by the receiver unit 101 is Communication ECU—Firewall function—Communication refusal event, and GW ECU—Tool authentication function—Authentication error event. Such a case corresponds to the individual pattern 1 and the individual pattern 2, in the attack pattern 1 in FIG. 3. That is, the event log analyzer unit 103 detects in the attack pattern 1, an abnormality corresponding to the individual pattern 1 and the individual pattern 2, each of which is an abnormality in the precursory behavior of the attack pattern 1. When such an abnormality is detected, the event log analyzer unit 103 reads out the individual pattern 3 (corresponding to the "second pattern") of the attack pattern 1 and instructs the transmitter unit 104 to transmit.

The transmitter unit 104, which may also be referred to as a transmitter 104. transmits the individual pattern 3 of the attack pattern 1, which is the "second pattern", to the attack monitoring terminal apparatus 200.

Here, "transmitting the second pattern . . . " includes not only the case of transmitting the second pattern itself but also the case of transmitting information that can generate or restore the second pattern.

In the above example, the event log analyzer unit 103 uses the event log received by the receiver unit 101 as it is. However, as a premise for detecting an abnormality, the event may be analyzed by performing statistical calculation on a plurality of event logs received by the receiver unit 101.

Figure 4A:
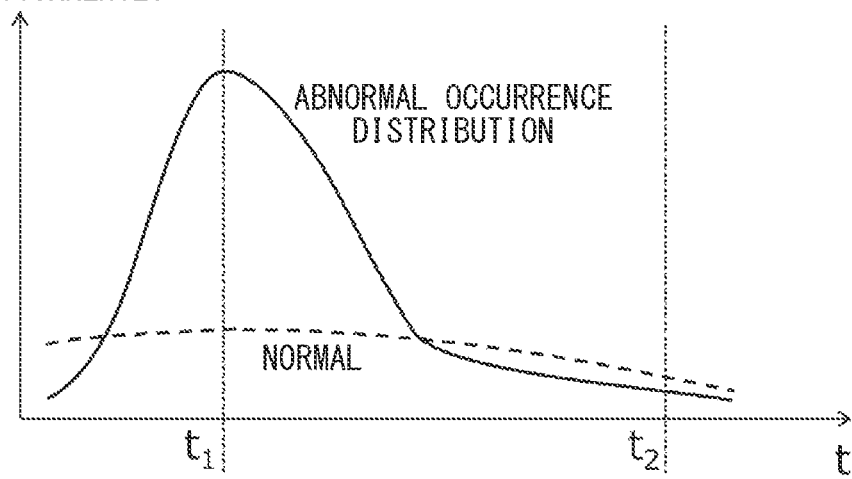
FIG. 4A is an explanatory diagram illustrating an analysis method performed by an event log analyzer unit of the attack monitoring center apparatus according to the embodiment of the present disclosure.
Figure 4B:
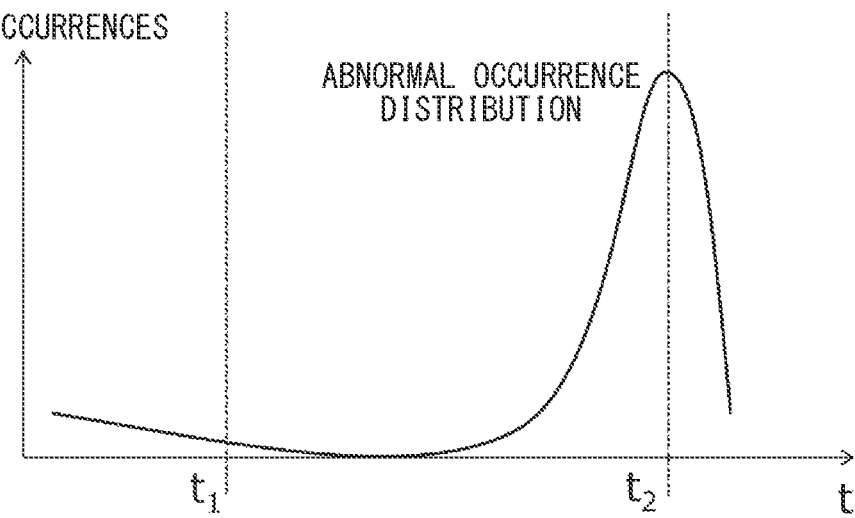
FIG. 4B is an explanatory diagram illustrating an analysis method performed by an event log analyzer unit of the attack monitoring center apparatus according to the embodiment of the present disclosure.

FIG. 4A and FIG. 4B each show an example of an event log analysis method by the event log analyzer unit 103. The event log analyzer unit 103 plots a plurality of event logs received by the receiver unit 101 by using the number of occurrences of the event log and the occurrence time of the event log for each event. In FIG. 4A, a plot of the event log A having the attribute of the Communication ECU—Firewall function—Communication refusal event is shown by the number of occurrences of the event log and the occurrence time of the event log. Further, in FIG. 4B, a plot of the event log B having the attribute of GW ECU—Tool authentication function—Authentication error event is shown in the same manner.

In FIG. 4A, an abnormal occurrence of the event log A can be seen with the time t1 as the apex, as compared with the normal time. Further, in FIG. 4B, an abnormal occurrence of the event log B can be seen with the time t2 as the apex. Since t1<t2, an abnormality occurs in the order of event log A and event log B.

Normally, an event that requires such statistical calculation cannot be determined to be abnormal by the event log alone. However, it can be recognized that an abnormality has occurred by observing statistically in this way. It is desirable that such statistical calculation be performed by the attack monitoring center apparatus 100 having abundant resources.

The order of the event log A and the event log B and the types of events correspond to the individual pattern 1 and the individual pattern 2 of the attack pattern 1 in FIG. 3. As described above, the event log analyzer unit 103 detects, in the attack pattern 1, abnormalities corresponding to the individual pattern 1 and the individual pattern 2, which are abnormalities in the precursory behavior of the attack pattern 1.

As described above, according to the attack monitoring terminal apparatus 200 and the attack monitoring center apparatus 100 of the present embodiment, an event log occurrence pattern DB is used which has information for distinguishing the first pattern and the second pattern. Therefore, it is possible to assign which apparatus to perform the abnormality detection process depending on the stage of the cyber attack and the amount of resources used. Further, as a result, even when the resources of the attack monitoring terminal apparatus 200 are weak and the network connection is unstable, the attack monitoring terminal apparatus 200 can determine a cyber attack in a timely manner without delay. Further, since the attack monitoring terminal apparatus 200 determines the cyber attack, it is possible to notify the driver driving the vehicle of the occurrence of the cyber attack without delay. At the same time, it is possible to execute vehicle control for ensuring safety without need of going through a communication network.

Figure 5:
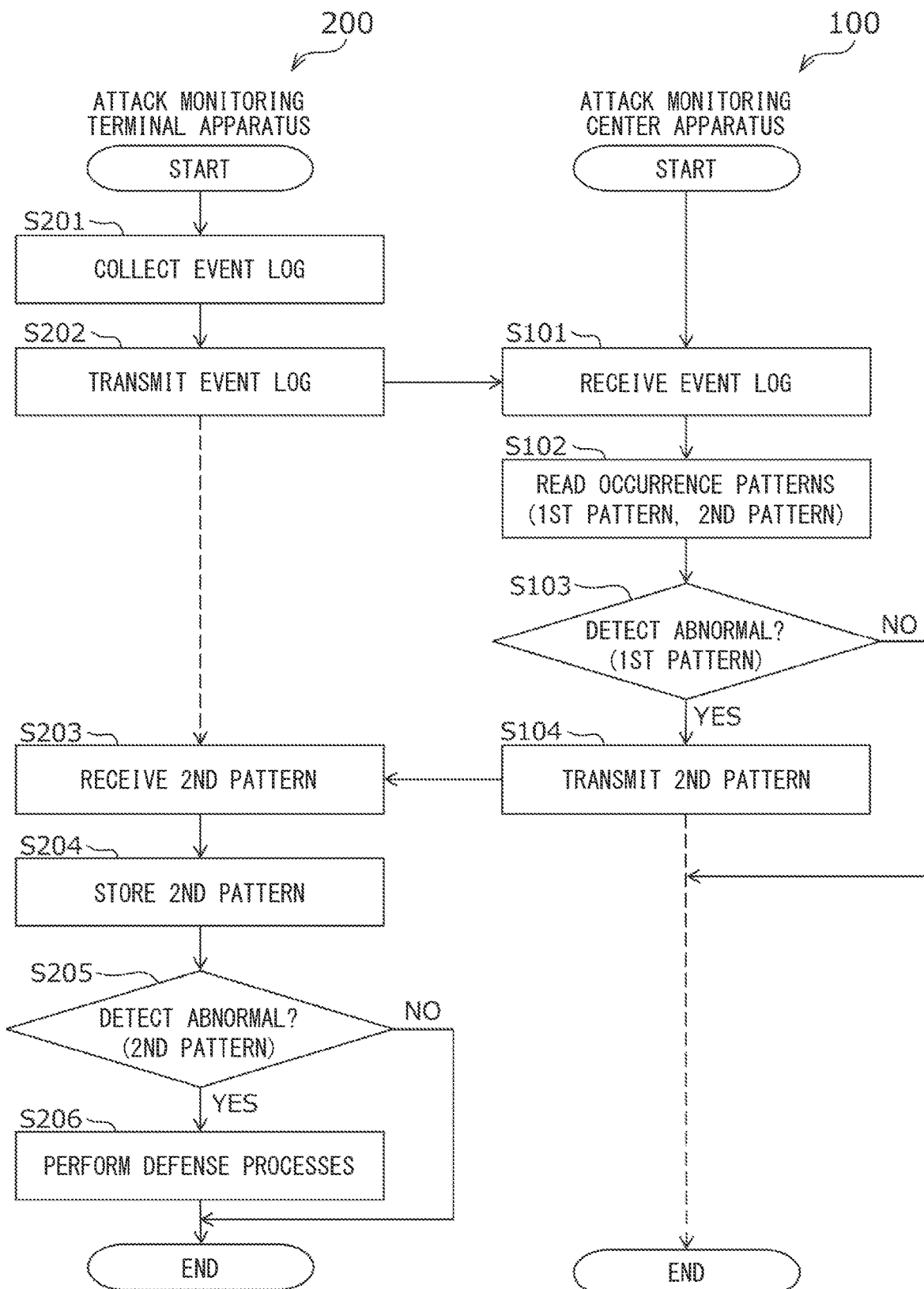
FIG. 5 is a flowchart illustrating operations of the attack monitoring terminal apparatus and the attack monitoring center apparatus according to the embodiment of the present disclosure.

(3) Outline of Operation of Attack Monitoring Terminal Apparatus and Attack Monitoring Center Apparatus The outline of the operation of the attack monitoring terminal apparatus 200 and the attack monitoring center apparatus 100 will be described with reference to the flowchart of FIG. 5. The following operation not only shows the attack monitoring method in the attack monitoring terminal apparatus 200, but also shows the processing steps of the attack monitoring program executed in the attack monitoring terminal apparatus 200. Further, it not only shows the attack monitoring method in the attack monitoring center apparatus 100, but also shows the processing steps of the attack monitoring program executed by the attack monitoring center apparatus 100. The processing steps are not limited to the order shown in FIG. 5. That is, the order may be changed as long as there is no restriction that the result of the previous step is used in the subsequent step.

Each security event detector unit of each ECU mounted on the vehicle detects a security event according to the function of each ECU. Then, the event log collection unit 202 of the attack monitoring terminal apparatus 200 collects the event log generated by each security event detector unit from each connected ECU (S201). The collected event log is output to the transmitter unit 203 and the attack determination unit 206.

The transmitter unit 203 transmits the event log collected in S201 to the attack monitoring center apparatus 100 via the communication unit 215 of the communication ECU and the communication network (S202).

The receiver unit 101 of the attack monitoring center apparatus 100 receives the event log transmitted from the attack monitoring terminal apparatus 200 (S101).

The first pattern and the second pattern describing the event log occurrence pattern assumed when receiving a cyber attack are read from the event log occurrence pattern database stored in the storage device 102 (S102).

The event log analyzer unit 103 detects an abnormality based on the first pattern of the event log received in S101 and the event log occurrence pattern read in S102 (S103). When an abnormality is detected, the transmitter unit 104 transmits the second pattern read in S102 to the attack monitoring terminal apparatus 200 (S104), and ends the process. Even if no abnormality is detected, the process ends.

The receiver unit 204 receives the second pattern from the attack monitoring center apparatus 100 via the communication unit 215 of the communication network and the communication ECU (S203).

The storage device 205 stores the second pattern received in S203.

The attack determination unit 206 reads out the second pattern from the storage device 205, and detects an abnormality based on the event log collected in S201 and the second pattern received in S203 (S205). When an abnormality is detected, the attack monitoring terminal apparatus 200 assumes that a cyber attack has been detected, performs various defense processes (S206), and ends the process. Even if no abnormality is detected, the process ends. As the defense process, for example, vehicle control, network communication stop or limit, ECU function stop or limit, service stop or limit, etc. are performed. As a result, it is conceivable to keep the control of the vehicle safe. The range to be controlled, for example, whether to target a network or an individual ECU depends on how far the attack target can be specified. The degree of control, such as stop or limit, depends on the risk of the effects of the attack. For example, suppose a case where a cyber attack is detected in a specific network of the attack monitoring terminal apparatus 200. In such a case, it is considered that the reliability of the network is lowered, the functions of the ECU on the network are limited and controlled to the safe side. At the same time, the communication transmitted from that network to another network is also considered to be unreliable, and the functions and services of the ECU that use the communication are restricted. In addition, if the IP address, port, and terminal information of the attack source can be specified, such information may be denied by adding it to the access denial list of the firewall.

(4) Details of Operations of Attack Monitoring Terminal Apparatus and Attack Monitoring Center Apparatus Next, with reference to FIG. 5 as appropriate, the details of the operations of the attack monitoring terminal apparatus 200 and the attack monitoring center apparatus 100 will be described with reference to specific examples. The following will be described assuming an example in which in order to endanger a vehicle, an attacker first communicates remotely with the vehicle, second takes the authority of the GW ECU inside the vehicle, and third performs an attack to transmit an illegal signal to the internal ECU to cause the vehicle to behave illegally.

If a communication from a source not authorized is made by an attacker and transmitted to the vehicle, a security event is detected by the firewall function of the security event detector unit 214 of the communication ECU. The security event detector unit 214 blocks the communication and generates an event log A (Communication ECU—Firewall function—Communication refusal event).

After that, the attacker tampers the website that the communication ECU frequently visits, installs malicious malware that exploits the vulnerability of the communication ECU by being triggered in response to the communication ECU accessing the website that was tampered, and changes the firewall setting of the communication ECU by malicious malware to break through the firewall. Then, the attacker tries to perform a tool authentication for privilege escalation to the GW ECU. In response thereto, the security event is detected by the tool authentication function of the security event detector unit 201 of the GW ECU. The security event detector unit 201 denies the tool authentication and generates an event log B (GW ECU—Tool authentication function—Authentication error event).

The event log collection unit 202 collects the event log A and the event log B, and transmits the event log A and the event log B to the attack monitoring center apparatus 100 via the transmitter unit 203 (S201). The event log collection unit 202 also outputs the event log A and the event log B to the attack determination unit 206. Naturally, since the second pattern, which is the event log occurrence pattern responding to the event log A and the event log B, is not stored in the storage device 205, the attack determination unit 206 does not detect an abnormality at this point (S205).

The receiver unit 101 of the attack monitoring center apparatus 100 receives the event log A and the event log B transmitted from the attack monitoring terminal apparatus 200 (S101). The event log analyzer unit 103 analyzes the event log A and the event log B as described with reference to FIG. 4, and finds that abnormalities occurred in the event log A at time t1 and in the event log B at time t2. Then, they are arranged in chronological order based on the time of the event log in which the abnormality occurred. In this case, the event log A and the event log B are arranged in this order.

The event log analyzer unit 103 reads out the event log occurrence pattern stored in the storage device 102 (S102), and performs an abnormality detection based on the first pattern of the read event log occurrence pattern (S103). In the case of this example, according to FIG. 3, the attack pattern 1 includes a row including the individual pattern 1 and the individual pattern 2 having the same type and order as the event log A and the event log B. Therefore, it is possible to detect an abnormality that the precursory behavior of the attack pattern 1 is occurring.

In response thereto, the event log analyzer unit 103 instructs the transmitter unit 104 to transmit the individual pattern 3, which is the second pattern showing the main attack behavior included in the attack pattern 1. The transmitter unit 104 transmits the individual pattern 3 (GW ECU—NIDS function—Cycle abnormality event) to the attack monitoring terminal apparatus 200 (S104).

The receiver unit 204 of the attack monitoring terminal apparatus 200 receives the individual pattern 3, and the received individual pattern 3 is stored in the storage device 205. FIG. 6 shows the second pattern transmitted from the transmitter unit 104, received by the receiver unit 204, and stored in the storage device 204.

Now assume that the attacker then breaks through the tool authentication and is able to transmit signals that affect the behavior of the vehicle to the inside of the vehicle.

On such an assumption, when the attacker transmits a signal for an attack to the internal ECU at a cycle different from the specification, a security event is detected by the NIDS function of the security event detector unit 201 of the GW ECU. The security event detector unit 201 generates an event log C (GW ECU—NIDS function—Cycle abnormality event).

The event log collection unit 202 collects the event log C and transmits it to the attack monitoring center apparatus 100 via the transmitter unit 203 (S201). The event log collection unit 202 also outputs the event log C to the attack determination unit 206.

The attack determination unit 206 reads the individual pattern 3 shown in FIG. 6 from the storage device 205, and detects an abnormality based on the event log C collected in S201 and the read individual pattern 3 (S205). In the case of this example, the event log C indicates the GW ECU—NIDS function—Cycle abnormality event, which matches the individual pattern 3, so that the attack determination unit 206 detects the abnormality in the event log C. Therefore, the attack monitoring terminal apparatus 200 performs various defense processes on the assumption that it has detected a cyber attack (S206).

As described above, the attack monitoring terminal apparatus 200 has received the second pattern showing the main attack behavior of the cyber attack from the attack monitoring center apparatus 100 in advance. Therefore, it is possible to detect a cyber attack without transmitting the event log to the attack monitoring center apparatus 100. Further, by using the second pattern of which the comparison process with the event log is light, it is possible to detect a cyber attack even with the attack monitoring terminal apparatus 200 having relatively few resources.

2. Modification Example

The above embodiment is an example, and may be modified as follows.

(1) Time-Series Information in Event Log Occurrence Pattern DB

In the event log occurrence pattern of FIG. 3, the individual patterns are arranged in chronological order in the order of expected occurrence. However, instead, information indicating the occurrence order of the individual patterns may be added. For example, a number indicating the order of occurrence may be assigned to each individual pattern. That is, the first pattern and the second pattern of the event log occurrence pattern DB need only be specified in time series, and the specification method is optional. Further, since the attack pattern does not necessarily mean that a plurality of individual patterns occur in chronological order, it is not necessary to specify the time series in that case. For example, if the order of occurrence is optional and the condition is that both the individual pattern 1 and the individual pattern 2 occur, it is not necessary to specify the chronological order of the individual pattern 1 and the individual pattern 2.

(2) Examples of Other Attack Patterns in Event Log Occurrence Pattern DB

The event log occurrence pattern of FIG. 3 has attack patterns 2 to 5 in addition to the attack pattern 1. The attack pattern 2 shows a case where the individual patterns 1 and 2 of the attack pattern 1 are common, but the attack is sent to the internal ECU without the cycle abnormality occurring in the GW ECU. In this case, as the individual pattern 3, a MAC authentication error event occurs in the internal ECU based on the message authentication function. Then, this individual pattern 3 becomes the second pattern referred to when the attack monitoring terminal apparatus 200 detects an abnormality. The attack pattern 3 shows a case where the individual pattern 2 of the attack pattern 2 is different and a filtering error event occurs in the GW ECU based on the ID filtering function. The attack pattern 4 shows a case where the individual pattern 1 of the attack pattern 1 is different and a pattern abnormality event occurs in the communication ECU based on the NIDS function. The attack pattern 5 shows a case where a tool is mechanically connected to the vehicle and an illegal signal is transmitted to the inside of the vehicle.

When a plurality of attack patterns are applicable, the event log analyzer unit 103 reads out all the second patterns of the corresponding attack patterns and instructs the transmitter unit 104 to transmit them. For example, the attack pattern 1 and the attack pattern 2 have the same individual pattern 1 and individual pattern 2. Therefore, suppose a case where the event log received by the receiver unit is (i) Communication ECU—Firewall function—Communication refusal event and (ii) the GW ECU—Tool authentication function—Authentication error event. In such a case, the event log corresponds to the individual pattern 1 and the individual pattern 2 of each of the attack pattern 1 and the attack pattern 2 in FIG. 3. When such an abnormality is detected, the event log analyzer unit 103 reads out the individual pattern 3 of each of the attack pattern 1 and the attack pattern 2, and instructs the transmitter unit 104 to transmit them.

(3) Analysis of Event Log

In the above-described embodiment, as shown in FIG. 4, the occurrence of an abnormality is recognized based on the relationship between the number of occurrences of the event log and the occurrence time of the event log, but the analysis method is not limited to this method. For example, when two types of event logs are received, it may be possible to analyze whether or not the contents of the event logs are inconsistent with each other. Further, in the above-described embodiment, when the event log analysis is required, the attack monitoring center apparatus 100 is used for the analysis, but the attack monitoring terminal apparatus 200 is not excluded from the analysis.

(4) Transmission Method of Second Pattern

In the above-described embodiment, the individual pattern of FIG. 3 is transmitted as it is as a method of transmitting the second pattern to the attack monitoring terminal apparatus 200. However, instead of this, information that can generate or restore the second pattern on the attack monitoring terminal apparatus 200 may be transmitted. For example, the list of individual patterns may be held in advance by the attack monitoring center apparatus 100 and the attack monitoring terminal apparatus 200, and the numbers of the corresponding individual patterns may be transmitted.

(5) Relationship Between Attack Monitoring Center Apparatus 100 and Attack Monitoring Terminal Apparatus 200

In the above-described embodiment, the attack monitoring center apparatus 100 will be described as an apparatus outside the vehicle, and the attack monitoring terminal apparatus 200 will be described as an in-vehicle terminal apparatus. However, this is a typical example, and the following examples are also possible. The attack monitoring terminal apparatus 200 may be a terminal apparatus held by a pedestrian or a driver of a vehicle, instead of being mounted on a vehicle. Both the attack monitoring terminal apparatus 200 and the attack monitoring center apparatus 100 may be apparatuses mounted on mutually different vehicles. In this case, it is necessary to be connected by a cellular network or a communication network using direct communication between vehicles. The attack monitoring terminal apparatus 200 may be a terminal apparatus connected to a wired LAN or the Internet, and the attack monitoring center apparatus may be a server apparatus connected to the wired LAN or the Internet. Alternatively, both apparatuses may be terminal apparatuses connected to a wired LAN or the Internet. That is, it can be applied to the field of typical computer systems.

3. Overview

The features of the attack monitoring center apparatus, the attack monitoring terminal apparatus, and the like in each embodiment of the present disclosure have been described above.

Since the terms used in each embodiment are examples, they may be replaced with synonymous terms or terms including synonymous functions.

The block diagram used in the description of the embodiment is a classification and arrangement of the configurations of the apparatuses according to their functions. An individual function of the functional blocks may be implemented by (i) hardware (i.e., by using hardware circuitry including digital and/or analog circuits without CPU), or (ii) software (i.e., by using CPU along with memory storing program instructions), or (iii) any combination of the hardware and the software. Further, since the block diagram shows the functions, the block diagram can be grasped as the disclosures of the method and the program that realizes the method.

In other words, the apparatuses (i.e., the attack monitoring center apparatus 100, the attack monitoring terminal apparatus 200, and the ECUs (A), (B)-(C), and the communication ECU) and methods thereof described in the above embodiment in the present disclosure may be implemented by one or more than one special-purpose computer. Such a special-purpose computer may be created (i) by configuring (a) a memory and a processor programmed to execute one or more particular functions embodied in computer programs, or (ii) by configuring (b) a processor provided by one or more special purpose hardware logic circuits, or (iii) by configuring a combination of (a) a memory and a processor programmed to execute one or more particular functions embodied in computer programs and (b) a processor provided by one or more special purpose hardware logic circuits.

The computer programs may be stored, as instructions being executed by a computer, in a tangible non-transitory computer-readable storage medium.

Order of functional blocks that can be grasped as processing, a sequence, and a method described in relation to each embodiment may be changed unless some restriction is imposed, for example, a result from one step is utilized at another step.

The terms "first", "second", or "N" (N is an integer) used in each embodiment and the present disclosure are used to distinguish two or more configurations and methods of the same type, it does not limit the order or superiority.

Each embodiment is premised on an attack monitoring terminal apparatus mounted on a vehicle and used for the vehicle. However, the present disclosure also includes a dedicated or general-purpose attack monitoring terminal apparatus other than that for vehicles, unless otherwise limited.

In each embodiment, the description has been made on the premise that the attack monitoring terminal apparatus disclosed in each embodiment is mounted on the vehicle, but it may be assumed that the pedestrian holds it.

Further, as an example of the form of the attack monitoring terminal apparatus of the present disclosure, the following can be mentioned. Examples of the form of the component include a semiconductor element, an electronic circuit, a module, and a microcomputer. Examples of the semi-finished product include an electronic control unit (ECU (Electric Control Unit)) and a system board. Examples of finished products include mobile phones, smartphones, tablets, personal computers (PCs), workstations, and servers. In addition, it includes a device having a communication function and the like, and examples thereof include a video camera, a still camera, and a car navigation system.

Further, necessary functions such as an antenna and a communication interface may be added to the attack monitoring terminal apparatus and the attack monitoring center apparatus.

It is assumed that the attack monitoring center apparatus of the present disclosure is used for the purpose of providing various services. With the provision of such a service, the attack monitoring center apparatus of the present disclosure is used, the method of the present disclosure is used, and/or the program of the present disclosure is executed.

The present disclosure is implemented not only by dedicated hardware having a configuration and a function described in relation to each embodiment. The present disclosure can also be implemented as a combination of a program for implementing the present disclosure, recorded on such a recording medium as memory and a hard disk and general-purpose hardware including dedicated or general-purpose CPU, memory, or the like, capable of executing the program.

A program stored in a non-transitory tangible storage medium (for example, an external storage device (a hard disk, a USB memory, a CD/BD, or the like) of dedicated or general-purpose hardware, or an internal storage device (a RAM, a ROM, or the like)) may also be provided to dedicated or general-purpose hardware via the recording medium or from a server via a communication line without using the storage medium. As a result, it is possible to always provide a latest function by updating the program.

INDUSTRIAL APPLICABILITY

The attack monitoring terminal apparatus of the present disclosure has been described as an electronic control apparatus for vehicles mainly mounted on automobiles. However, it can be applied not only to motorcycles, bicycles with electric motors, and railways, but also to mobile bodies such as pedestrians, ships, and aircraft. In addition, it can be applied to apparatuses used for various purposes such as mobile phones, tablets, and game machines.

For reference to further explain features of the present disclosure, the description is added as follows.

In recent years, technologies for driving support and automated driving control, including V2X (Vehicle to Everything) such as vehicle-to-vehicle communication and vehicle-to-road communication, have been attracting attention. As a result, a vehicle has a communication function, and so-called connectivity of the vehicle has been promoted. As a result, vehicles may be increasingly vulnerable to cyber attacks. Since vehicles move at high speeds, there is a high risk of accidents that could affect people if the vehicles lose the control of the vehicle themselves due to a cyber attack. Stronger defense measures are thereby required against cyber attacks.

Here, in the field of computer systems, countermeasures against cyber attacks have been taken for some time past.

For instance, there is described a log monitoring technique as follows. Such a technique focuses on the fact that there is a combination of log contents that can logically derive the possibility of abnormality when collating the log contents acquired from multiple connected devices. This combination is stored in the storage device as an abnormal pattern in advance, and is collated with the actual log. It is thereby possible to detect the monitoring target suspected of fraud at an early stage.

The present inventors have found the following issues. Unlike the field of typical computer systems, computers installed in vehicles are powerless in resources such as CPU and memory. It is thus difficult to analyze complex event logs. To respond thereto, the event logs may be analyzed by a resource-rich apparatus such as a server outside the vehicle. In this case, it is necessary to connect the vehicle and the server by using wireless communication. However, in wireless communication, the connection may become unstable depending on the environment, and it may be difficult to respond to the vehicle in real time. As a result, the risk of exposure to cyber attacks increases. Further, even when the resources are not weak, if the event logs are analyzed by a server or the like outside the vehicle, the same issue occurs when the network connection is unstable.

It is thus desired for the present disclosure to provide an attack monitoring center apparatus, an attack monitoring terminal apparatus, a method and program used therefor, which are capable of determining a cyber attack without delay even when resources are weak and/or network connection is unstable. The issues are described in cases where the apparatuses mounted in vehicle suffer cyber attacks. However, this is only an example of the issues. Even if it is not mounted in a vehicle, there may be an issue that resources may be weak and/or network connection may become unstable. Also, it goes without saying that network connections can be unstable, even if they are wired.

Aspects of the present disclosure described herein are set forth in the following clauses.

According to a first aspect of the present discloser, an attack monitoring center apparatus is provided to include a receiver unit, a storage device, an event analyzer unit, and a transmitter unit. The receiver unit is configured to receive an event log transmitted from an attack monitoring terminal apparatus via a communication network. The storage device is configured to store an event log occurrence pattern database that describes event log occurrence patterns including a first pattern and a second pattern, which are expected when receiving cyber attacks, the first pattern being referred to in response to an abnormality being detected in the attack monitoring center apparatus, the second pattern being referred to in response to an abnormality being detected in the attack monitoring terminal apparatus. The event log analyzer unit is configured to detect an abnormality based on the event log and the first pattern. The transmitter unit is configured to transmit the second pattern to the attack monitoring terminal apparatus in response to the abnormality being detected by the event log analyzer unit.

According to a second aspect of the present discloser, an attack monitoring terminal apparatus is provided to include an event log collection unit, a transmitter unit, a receiver unit, a storage device, and an attack determination unit. The event log collection unit is configured to collect event logs from each connected apparatus. The transmitter unit is configured to transmit the event log to an attack monitoring center apparatus via a communication network. The receiver unit is configured to receive only a second pattern of a first pattern and the second pattern from the attack monitoring center apparatus, the first pattern and the second pattern, which are expected when receiving cyber attacks, the first pattern being referred to in response to an abnormality being detected in the attack monitoring center apparatus, the second pattern being referred to in response to an abnormality being detected in the attack monitoring terminal apparatus. The storage device is configured to store the second pattern. The attack determination unit is configured to read the second pattern from the storage device and detect an abnormality based on the event log and the second pattern.

According to a third aspect of the present discloser, an attack monitoring method in an attack monitoring center apparatus is provided to include the followings: receiving an event log transmitted from an attack monitoring terminal apparatus via a communication network; reading out a first pattern and a second pattern from an event log occurrence pattern database that describes event log occurrence patterns including the first pattern and the second pattern, which are expected when receiving cyber attacks, the first pattern being referred to in response to an abnormality being detected in the attack monitoring center apparatus, the second pattern being referred to in response to an abnormality being detected in the attack monitoring terminal apparatus; detecting an abnormality based on the event log and the first pattern; and transmitting the second pattern to the attack monitoring terminal apparatus in response to detecting the abnormality.

According to a fourth aspect of the present discloser, an attack monitoring method in an attack monitoring terminal apparatus is provided to include the followings: collecting event logs from each connected device; transmitting the event log to an attack monitoring center apparatus via a communication network; receiving only a second pattern of a first pattern and the second pattern from the attack monitoring center apparatus, the first pattern and the second pattern, which are expected when receiving cyber attacks, the first pattern being referred to in response to an abnormality being detected in the attack monitoring center apparatus, the second pattern being referred to in response to an abnormality being detected in the attack monitoring terminal apparatus; storing the second pattern; reading the second pattern; and detecting an abnormality based on the event log and the second pattern.

According to a fifth aspect of the present discloser, an attack monitoring system is provided to include an attack monitoring center apparatus and an attack monitoring terminal apparatus. The attack monitoring center apparatus includes a first receiver unit, a first storage device, an event analyzer unit, and a first transmitter unit. The first receiver unit is configured to receive an event log transmitted from an attack monitoring terminal apparatus via a communication network. The first storage device is configured to store an event log occurrence pattern database that describes event log occurrence patterns including a first pattern and a second pattern, which are expected when receiving cyber attacks, the first pattern being referred to in response to an abnormality being detected in the attack monitoring center apparatus, the second pattern being referred to in response to an abnormality being detected in the attack monitoring terminal apparatus. The event log analyzer unit is configured to detect an abnormality based on the event log and the first pattern. The first transmitter unit is configured to transmit the second pattern to the attack monitoring terminal apparatus in response to the abnormality being detected by the event log analyzer unit. The attack monitoring terminal apparatus includes an event log collection unit, a second transmitter unit, a second receiver unit, a second storage device, and an attack determination unit. The event log collection unit is configured to collect event logs from each connected apparatus. The second transmitter unit is configured to transmit the event log to an attack monitoring center apparatus via a communication network. The second receiver unit is configured to receive only the second pattern of the first pattern and the second pattern from the attack monitoring center apparatus, the first pattern and the second pattern, which are expected when receiving cyber attacks, the first pattern being referred to in response to the abnormality being detected in the attack monitoring center apparatus, the second pattern being referred to in response to the abnormality being detected in the attack monitoring terminal apparatus. The second storage device is configured to store the second pattern. The attack determination unit is configured to read the second pattern from the second storage device and detect an abnormality based on the event log and the second pattern.

With the above configuration, even when the resources of the attack monitoring terminal apparatus are weak and/or the network connection with the attack monitoring center apparatus is unstable, the cyber attack can be determined without delay.

What is claimed is:

1. An attack monitoring center apparatus, comprising:
a receiver unit configured to receive an event log transmitted from an attack monitoring terminal apparatus via a communication network;
a storage configured to store an event log occurrence pattern database that describes event log occurrence patterns including a first pattern and a second pattern, which are expected when receiving cyber attacks,
the first pattern being referred to in response to an abnormality being detected in the attack monitoring center apparatus, the second pattern being referred to in response to an abnormality being detected in the attack monitoring terminal apparatus;
an event log analyzer unit configured to detect an abnormality based on the event log and the first pattern; and
a transmitter unit configured to transmit the second pattern to the attack monitoring terminal apparatus in response to the abnormality being detected by the event log analyzer unit;
wherein the attack monitoring terminal apparatus is installed inside a vehicle and the attack monitoring center apparatus is installed outside of the vehicle;
wherein the first pattern is assigned a first event indicating a precursory behavior of a cyber attack and the second pattern is assigned a second event indicating a main attack behavior of the cyber attack;
wherein the transmitter unit is configured to transmit only the second pattern for detecting the main attack behavior;
wherein the attack monitoring apparatus is configured to detect an abnormality only in the main attack behavior of the cyber attack on a vehicle side; and
wherein an amount of resources required to detect the abnormality using the first pattern is greater than an amount of resources required to detect the abnormality using the second pattern.

2. The attack monitoring center apparatus according to claim 1, wherein:
the event log analyzer unit is further configured to detect the abnormality based on a relationship between a total number of occurrences of the event log and an occurrence time of the event log.

3. The attack monitoring center apparatus according to claim 1, wherein:
a time series order of the first pattern and the second pattern is specified in the event log occurrence pattern database.

4. An attack monitoring terminal apparatus, comprising:
an event log collection unit configured to collect an event log from each connected apparatus;
a transmitter unit configured to transmit the event log to an attack monitoring center apparatus via a communication network;
a receiver unit configured to receive only a second pattern from among a first pattern and the second pattern from the attack monitoring center apparatus, the first pattern and the second pattern, which are expected when receiving cyber attacks,
the first pattern being referred to in response to an abnormality being detected in the attack monitoring center apparatus,
the second pattern being referred to in response to an abnormality being detected in the attack monitoring terminal apparatus;
a storage configured to store the second pattern; and
an attack determination unit configured to
read the second pattern from the storage and
detect an abnormality based on the event log and the second pattern; and
wherein the attack monitoring terminal apparatus is installed inside a vehicle and the attack monitoring center apparatus is installed outside of the vehicle;
wherein the first pattern is assigned an event indicating precursory behavior of a cyber attack, the event assigned to the first pattern requiring a larger amount of resources to detect the abnormality in the attack monitoring center apparatus than an event assigned to the second pattern;
wherein the attack monitoring terminal apparatus receives the second pattern showing the main attack behavior of the cyber attack from the attack monitoring center apparatus in advance;
wherein the attack monitoring terminal apparatus receives only the second pattern for detecting the main attack behavior; and
wherein the attack monitoring apparatus is configured to detect an abnormality only in the main attack behavior of a cyber attack on a vehicle side.

5. The attack monitoring terminal apparatus according to claim 4, wherein:
the attack monitoring terminal apparatus is mounted on a mobile body.

6. A computer-implemented attack monitoring method performed by a processor for an attack monitoring center apparatus, comprising:
receiving an event log transmitted from an attack monitoring terminal apparatus via a communication network;
reading out a first pattern and a second pattern from an event log occurrence pattern database that describes event log occurrence patterns including the first pattern and the second pattern, which are expected when receiving cyber attacks,
the first pattern being referred to in response to an abnormality being detected in the attack monitoring center apparatus,
the second pattern being referred to in response to an abnormality being detected in the attack monitoring terminal apparatus;
detecting an abnormality based on the event log and the first pattern;
and transmitting the second pattern to the attack monitoring terminal apparatus in response to detecting the abnormality;
wherein the attack monitoring terminal apparatus is installed inside a vehicle and the attack monitoring center apparatus is installed outside of the vehicle;
wherein the first pattern is assigned a first event indicating a precursory behavior of a cyber attack and the second pattern is assigned a second event indicating a main attack behavior of the cyber attack;
wherein only the second pattern for detecting the main attack behavior is transmitted to the attack monitoring terminal apparatus;
wherein the attack monitoring apparatus is configured to detect an abnormality only in the main attack behavior of the cyber attack on a vehicle side; and
wherein an amount of resources required to detect the abnormality using the first pattern is greater than an amount of resources required to detect the abnormality using the second pattern.

7. A non-transitory computer readable storage medium storing an attack monitoring program product comprising instructions for execution by a computer for an attack monitoring center apparatus, the instructions including the method according to claim 6, which is computer-implemented.

8. A computer-implemented attack monitoring method performed by a processor for an attack monitoring terminal apparatus, comprising:
collecting an event log from each connected device;

transmitting the event log to an attack monitoring center apparatus via a communication network;
receiving only a second pattern from among a first pattern and the second pattern from the attack monitoring center apparatus, the first pattern and the second pattern, which are expected when receiving cyber attacks, the first pattern being referred to in response to an abnormality being detected in the attack monitoring center apparatus, the second pattern being referred to in response to an abnormality being detected in the attack monitoring terminal apparatus;
storing the second pattern;
and reading the second pattern to detect an abnormality based on the event log and the second pattern;
wherein the attack monitoring terminal apparatus is installed inside a vehicle and the attack monitoring center apparatus is installed outside of the vehicle;
wherein the first pattern is assigned a first event indicating a precursory behavior of a cyber attack and the second pattern is assigned a second event indicating a main attack behavior of the cyber attack:
wherein the computer-implemented attack monitoring method further comprises transmitting only the second pattern for detecting the main attack behavior to the attack monitoring terminal apparatus;
wherein the attack monitoring apparatus is configured to detect an abnormality only in the main attack behavior of the cyber attack on a vehicle side; and
wherein an amount of resources required to detect the abnormality using the first pattern is greater than an amount of resources required to detect the abnormality using the second pattern.

9. A non-transitory computer readable storage medium storing an attack monitoring program product comprising instructions for execution by a computer for an attack monitoring terminal apparatus, the instructions including the method according to claim 8, which is computer-implemented.

10. An attack monitoring system including an attack monitoring center apparatus and an attack monitoring terminal apparatus,
the attack monitoring center apparatus comprising:
a first receiver unit configured to receive an event log transmitted from the attack monitoring terminal apparatus via a communication network;
a first storage configured to store an event log occurrence pattern database that describes event log occurrence patterns including a first pattern and a second pattern, which are expected when receiving cyber attacks,
the first pattern being referred to in response to an abnormality being detected in the attack monitoring center apparatus, the second pattern being referred to in response to an abnormality being detected in the attack monitoring terminal apparatus;
an event log analyzer unit configured to detect an abnormality based on the event log and the first pattern; and
a first transmitter unit configured to transmit the second pattern to the attack monitoring terminal apparatus in response to the abnormality being detected by the event log analyzer unit,
the attack monitoring terminal apparatus comprising:
an event log collection unit configured to collect an event log from each connected apparatus;
a second transmitter unit configured to transmit the event log to the attack monitoring center apparatus via a communication network;
a second receiver unit configured to receive only the second pattern from among the first pattern and the second pattern from the attack monitoring center apparatus, the first pattern and the second pattern, which are expected when receiving cyber attacks,
the first pattern being referred to in response to the abnormality being detected in the attack monitoring center apparatus,
the second pattern being referred to in response to the abnormality being detected in the attack monitoring terminal apparatus;
a second storage configured to store the second pattern; and
an attack determination unit configured to read the second pattern from the second storage and detect an abnormality based on the event log and the second pattern;
wherein the attack monitoring terminal apparatus is installed inside a vehicle and the attack monitoring center apparatus is installed outside of the vehicle;
wherein the first pattern is assigned a first event indicating a precursory behavior of a cyber attack and the second pattern is assigned a second event indicating a main attack behavior of the cyber attack:
wherein only the second pattern for detecting the main attack behavior is transmitted to the second receiver unit;
wherein the attack monitoring apparatus is configured to detect an abnormality only in the main attack behavior of the cyber attack on a vehicle side; and
wherein an amount of resources required to detect the abnormality using the first pattern is greater than an amount of resources required to detect the abnormality using the second pattern.

11. The attack monitoring center apparatus according to claim 1, further comprising:
one or more processors communicably coupled to the storage, the one or more processors configured to implement the receiver unit, the event log analyzer unit, and the transmitter unit.

12. The attack monitoring terminal apparatus according to claim 4, further comprising:
one or more processors communicably coupled to the storage, the one or more processors configured to implement the event log collection unit, the transmitter unit, the receiver unit, and the attack determination unit.

13. The attack monitoring system according to claim 10, wherein the attack monitoring center apparatus further comprises:
one or more first processors communicably coupled to the first storage, the one or more first processors configured to implement the first receiver unit, the event log analyzer unit, and the first transmitter unit, and
wherein the attack monitoring terminal apparatus further comprises:
one or more second processors communicably coupled to the second storage, the one or more second processors configured to implement the event log collection unit, the second transmitter unit, the second receiver unit, and the attack determination unit.

14. An attack monitoring terminal apparatus, comprising:
an event log collection unit configured to collect an event log from each connected apparatus;
a transmitter unit configured to transmit the event log to an attack monitoring center apparatus via a communication network;

a receiver unit configured to receive only a second pattern from among a first pattern and the second pattern from the attack monitoring center apparatus, the first pattern and the second pattern, which are expected when receiving cyber attacks,
   the first pattern being referred to in response to an abnormality being detected in the attack monitoring center apparatus,
   the second pattern being referred to in response to an abnormality being detected in the attack monitoring terminal apparatus;
a storage configured to store the second pattern; and
an attack determination unit configured to
   read the second pattern from the storage and
   detect an abnormality based on the event log and the second pattern; and
wherein the attack monitoring terminal apparatus is installed inside a vehicle and the attack monitoring center apparatus is installed outside of the vehicle; and wherein the second pattern is assigned an event indicating main attack behavior of a cyber attack, the event assigned to the second pattern requiring a lesser amount of resources to detect the abnormality in the attack monitoring terminal apparatus than an event assigned to the first pattern;

wherein the attack monitoring terminal apparatus receives the second pattern showing the main attack behavior of the cyber attack from the attack monitoring center apparatus in advance;

wherein the attack monitoring terminal apparatus receives only the second pattern for detecting the main attack behavior; and wherein the attack monitoring apparatus is configured to detect an abnormality only in the main attack behavior of a cyber attack on a vehicle side.

\* \* \* \* \*